(12) United States Patent
Riley et al.

(10) Patent No.: US 9,988,918 B2
(45) Date of Patent: Jun. 5, 2018

(54) COMPRESSOR SYSTEM AND AIRFOIL ASSEMBLY

(71) Applicant: General Electric Company, Schenectady, NY (US)

(72) Inventors: Shawn Patrick Riley, Cincinnati, OH (US); Abigail Rose Vaughn, Cincinnati, OH (US); Haiyun Hu, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 14/702,021

(22) Filed: May 1, 2015

(65) Prior Publication Data

US 2016/0319840 A1    Nov. 3, 2016

(51) Int. Cl.
*F01D 9/04* (2006.01)
*F01D 11/00* (2006.01)
(Continued)

(52) U.S. Cl.
CPC .............. *F01D 9/044* (2013.01); *F01D 9/041* (2013.01); *F01D 9/042* (2013.01); *F01D 11/005* (2013.01); *F01D 25/246* (2013.01); *F04D 29/542* (2013.01); *F05D 2230/237* (2013.01); *F05D 2240/122* (2013.01); *F05D 2240/125* (2013.01);
(Continued)

(58) Field of Classification Search
CPC .......... F01D 9/041; F01D 9/042; F01D 9/044; F01D 11/005; F01D 25/246; F05D 2240/122; F05D 2240/135; F05D 2260/941; F05D 2230/237
See application file for complete search history.

(56) References Cited

U.S. PATENT DOCUMENTS 4,344,738 A    8/1982   Kelly et al.
6,409,472 B1 *  6/2002   McMahon ............ F01D 5/3023
                                          415/119

(Continued)

FOREIGN PATENT DOCUMENTS

CN    101408114 A    4/2009
EP    2189662 A2     5/2010
(Continued)

OTHER PUBLICATIONS

European Search Report and Opinion issued in connection with corresponding EP Application No. 6167686.1 dated Oct. 7, 2016.
(Continued)

*Primary Examiner* — Igor Kershteyn
*Assistant Examiner* — Brian P Wolcott
(74) *Attorney, Agent, or Firm* — General Electric Company; Brian P. Overbeck (57) ABSTRACT

An airfoil assembly for a turbine engine, comprising at least one airfoil having a leading edge and a trailing edge, a band having an inner side and an outer side and rigidly coupled to the at least one airfoil along a portion of an interface between the band and the at least one airfoil for providing at least a portion of support for the at least one airfoil, a relief located in the band at the leading edge or the trailing edge of the at least one airfoil and defining a stress relief gap between the band and the leading edge or trailing edge and a closure preventing airflow through the relief.

11 Claims, 7 Drawing Sheets

(51) Int. Cl.
  *F01D 25/24* (2006.01)
  *F04D 29/54* (2006.01)
(52) U.S. Cl.
  CPC .... *F05D 2240/80* (2013.01); *F05D 2260/941* (2013.01)

(56) References Cited

U.S. PATENT DOCUMENTS

| | | | |
|---|---|---|---|
| 6,419,452 | B1 | 7/2002 | Frosini et al. |
| 6,543,998 | B1 | 4/2003 | Scharl |
| 8,177,502 | B2 * | 5/2012 | Headley .................. F01D 9/041 415/209.3 |
| 8,920,117 | B2 * | 12/2014 | Bouchard ............. F01D 25/162 415/209.4 |
| 2003/0033815 | A1 | 2/2003 | Proctor et al. |
| 2005/0129514 | A1 | 6/2005 | Mons et al. |
| 2007/0231131 | A1 | 10/2007 | Aynes et al. |
| 2010/0126018 | A1 | 5/2010 | Headley et al. |
| 2011/0311355 | A1 * | 12/2011 | Benkler .................. F01D 9/041 415/197 |
| 2012/0051938 | A1 | 3/2012 | Bertoli |
| 2012/0183406 | A1 | 7/2012 | Yoshida et al. |
| 2013/0330198 | A1 | 12/2013 | Farineau et al. |
| 2014/0119929 | A1 | 5/2014 | Schlemmer et al. |
| 2014/0174098 | A1 | 6/2014 | Duong et al. |

FOREIGN PATENT DOCUMENTS

| | | |
|---|---|---|
| JP | 2004197622 A | 7/2004 |
| JP | 2007270833 A | 10/2007 |
| JP | 2010127280 A | 6/2010 |
| JP | 2012526228 A | 10/2012 |

OTHER PUBLICATIONS

First Office Action and Search issued in connection with corresponding CN Application No. 201610548995.4 dated May 12, 2017.

Unofficial English Translation of Japanese Office Action issued in connection with corresponding JP Application No. 2016092357 dated Jun. 27, 2017.

* cited by examiner

COMPRESSOR SYSTEM AND AIRFOIL ASSEMBLY

BACKGROUND OF THE INVENTION

Turbine engines, and particularly gas or combustion turbine engines, are rotary engines that extract energy from a flow of combusted gases passing through the engine onto a multitude of turbine blades. Air can be pressurized in a compressor during operation. The air channeled through the compressor can be mixed with fuel in a combustor and ignited, generating hot combustion gases which flow through turbine stages that extract energy therefrom for powering the fan and compressor rotors and generate engine thrust to propel an aircraft in flight or to power a load, such as an electrical generator.

The compressor includes a rotor assembly and a stator assembly. The stator assembly includes a plurality of circumferentially spaced apart stator vanes or airfoils that direct the compressed gas entering the compressor to the rotor blades. The stator vanes extend radially between an inner band and an outer band. A gas flow path through the stator assembly is bound radially inward by the inner bands, and radially outward by outer bands. The stator vane segments are mounted within a compressor casing. A vane stage includes a plurality of circumferentially arranged vane segments, with each segment having a plurality of airfoils extending between an arcuate inner band and an arcuate outer band.

In some designs, the vane segments are supported solely at its outer band since a conventional annular seal member is disposed between rotor stages, preventing stationary support of the inner band as well. Accordingly, the airfoils in these vane segments are cantilevered from the outer band support which creates bending moments due to the fluid flowing between the vanes which must be suitably reacted or accommodated through the outer band. The bending moments in some of these airfoils may be significant since they are supported solely at their outer band, with the inner band thereof being unsupported.

During engine operation, the gas flow through the flow path induces mechanical, thermal, and aerodynamic loads on the airfoils. Some of these loads are transmitted by the airfoils to support structures in the engine through the outer bands that are coupled to the airfoil and reacted by the support structures. In some designs, the inner bands may also, similarly, transmit some of the loads applied on the airfoils by the gas flow and reacted by other support structures. Within at least some conventional gas turbine engines, the stresses in the airfoil near the interface with the outer band and near the support structures may become large enough to cause distress in the airfoil. Under sufficiently large stresses, cracking may occur in the airfoils within the airfoil assembly near support structure locations that react the loading applied to the airfoils in the airfoil assembly by the gas flow. Designing with additional thickness at these high locations may not be possible for several reasons, such as, aerodynamic considerations, flow modifications, additional weight, and changed dynamic characteristics of the vanes and/or excessive leakages in the airfoil assemblies.

BRIEF DESCRIPTION OF THE INVENTION

In one aspect, an embodiment of the invention relates to an airfoil assembly for a turbine engine including at least one airfoil having a leading edge and a trailing edge, a band having an inner side and an outer side and rigidly coupled to the at least one airfoil along a portion of an interface between the band and the at least one airfoil for providing at least a portion of support for the at least one airfoil, a relief located in the band at the leading edge or the trailing edge of the at least one airfoil and defining a stress relief gap between the band and the leading edge or the trailing edge, and a cross-flow closure closing the relief to prevent airflow through the slot between the inner and outer sides.

DESCRIPTION OF EMBODIMENTS OF THE INVENTION

Figure 1:
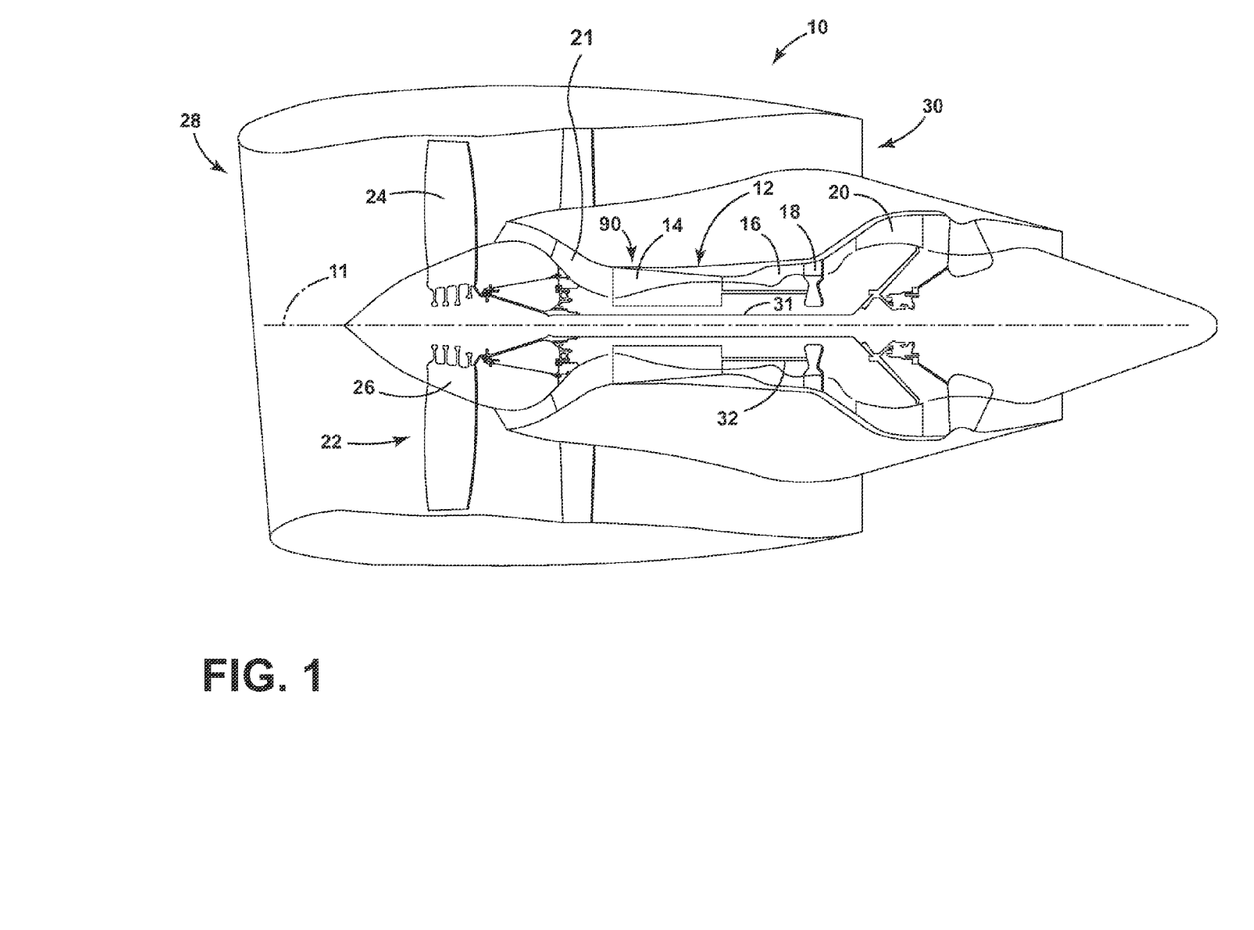
FIG. 1 is a schematic cross-sectional diagram of a gas turbine engine for an aircraft, including a compressor system.

FIG. 1 shows a cross-sectional view of a gas turbine engine assembly 10 having a longitudinal axis 11. The gas turbine engine assembly 10 includes a core gas turbine engine 12 that includes a high-pressure compressor 14, a combustor 16, a high-pressure turbine 18, a low-pressure turbine 20 and a low-pressure compressor 21. A fan assembly 22 having an array of fan blades 24 that extend radially outward from a rotor disk 26 can be coupled axially upstream from the core gas turbine engine 12. The gas turbine engine assembly 10 has been illustrated as having an intake side 28 and an exhaust side 30. A first rotor shaft 31 couples together the core gas turbine engine 12, fan assembly 22, low-pressure turbine 20, and low-pressure compressor 21. A second rotor shaft 32 couples together the high-pressure compressor 14 and high-pressure turbine 18.

In operation, air flows through the fan assembly blades 24 and compressed air is supplied to a compressor system 90 that includes the high-pressure compressor 14. The air discharged from the fan assembly 22 is channeled to the high-pressure compressor 14 wherein the airflow is further compressed and channeled to combustor 16. Products of combustion from combustor 16 are utilized to drive high-pressure turbine 18 and low-pressure turbine 20. Low-pressure turbine 20 drives fan assembly 22 via the first rotor shaft 31. Gas turbine engine assembly 10 is operable at a range of operating conditions between design operating conditions and off-design operating conditions.

Figure 2:
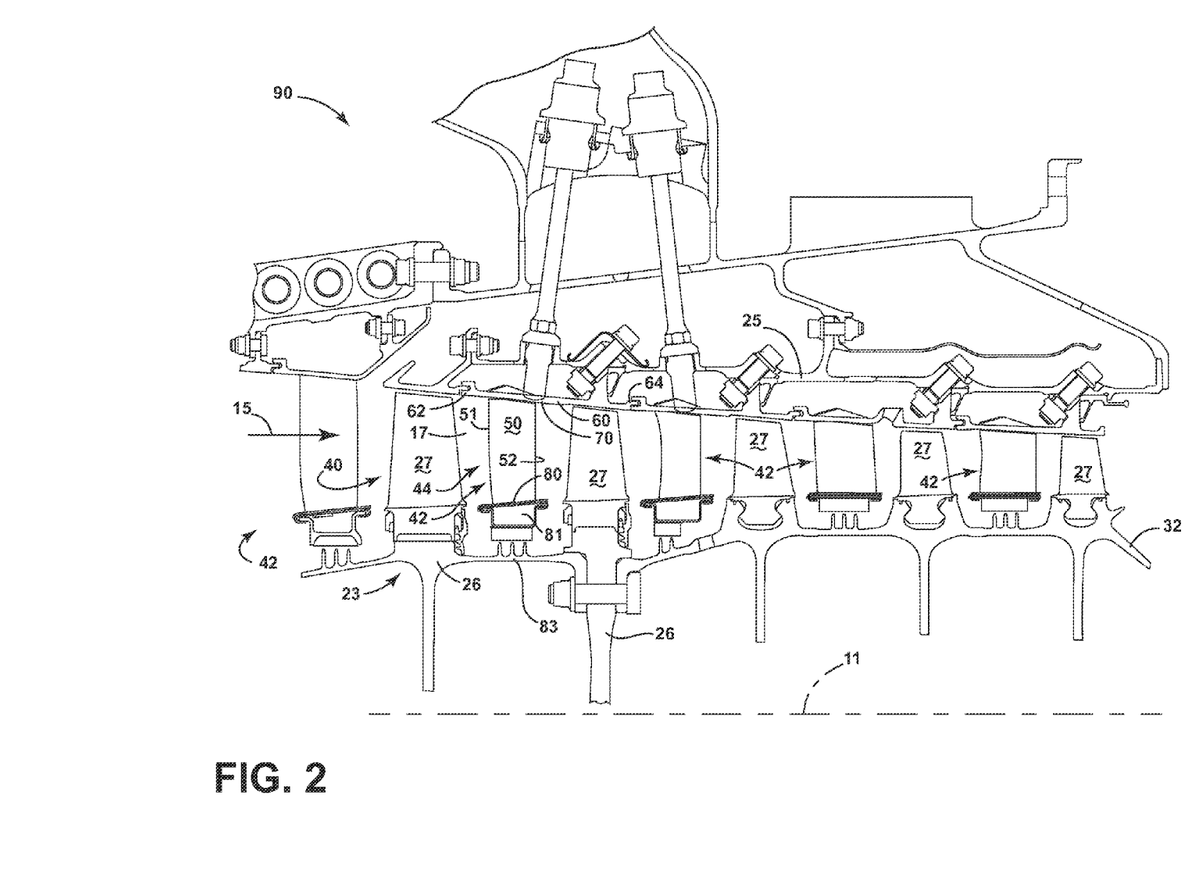
FIG. 2 is an enlarged, axial cross-sectional view of a portion of the compressor system of FIG. 1 and having multiple airfoil assemblies according to an embodiment of the invention.

Core airflow, shown as item 15 in FIG. 2, flows in an annular flow path 17 of the compressor system 90. The compressor system 90 includes a plurality of compression stages 40 wherein each stage 40 includes a row of circumferentially spaced rotor blades 27 and a stationary stator assembly 42. The stator assembly 42 includes a row of circumferentially spaced arcuate stator airfoil assemblies 44 that are arranged circumferentially around the longitudinal axis 11. Each stator airfoil assembly 44 includes an airfoil 50 coupled to a band that supports the airfoil 50. In the exemplary embodiment shown in FIG. 2, the airfoil 50 is coupled to an arcuate outer band 60 located near the radially outer portion of the airfoil 50, and an arcuate inner band 80 located at the radially inner portion of the airfoil 50. In this manner, the airfoil extends between the inner band 80 and the outer band 60.

The efficiency of the compressor system 90 is primarily determined by the smoothness of the airflow. During design, every effort is made to keep the air flowing smoothly through the compressor system 90 to minimize airflow losses due to friction and turbulence. This task is a difficult one, since the air is forced to flow into ever-higher pressure zones. Air has the natural tendency to flow toward low-pressure zones. If air were allowed to flow into the lower pressure zones, the efficiency of the compressor system 90 would decrease tremendously as the energy used to increase the pressure of the air was wasted. To prevent this from occurring, seals are incorporated to prevent air leakage.

The inner band 80 supports a seal 81, which interfaces with a conventional annular seal 83 located between two adjacent rotors. Conventional sealing shrouds or segment seals 81 are suitably attached to the radially inner bands 80 of the airfoil assemblies 44 to cooperate with labyrinth teeth extending from annular seal 83 of the compressor rotor for effecting interstage seals. In this configuration, the individual airfoil assemblies 44 are mounted to the outer casing 25 solely by their outer bands, with the airfoils 50 and inner bands 80 being suspended therefrom. The compressor system 90 can also include a compressor rotor 23 having rotor blades 27 typically supported by rotor disks 26, and are coupled to rotor shaft 32.

A casing 25 surrounds the compressor 14 and supports the airfoil assemblies 44 in the stator assemblies 42. Each airfoil assembly 44 includes an arcuate forward rail 62 located axially forward from the airfoil 50, and an arcuate aft rail 64 located axially aft from the airfoil 50, that engage with a corresponding rail in adjacent components or the casing 25. The loads that are experienced by each airfoil assembly 44 are reacted with the support structures in the casing 25 through lugs 34, 35, 36 (see FIG. 3) located on each airfoil assembly 44.

Figure 3:
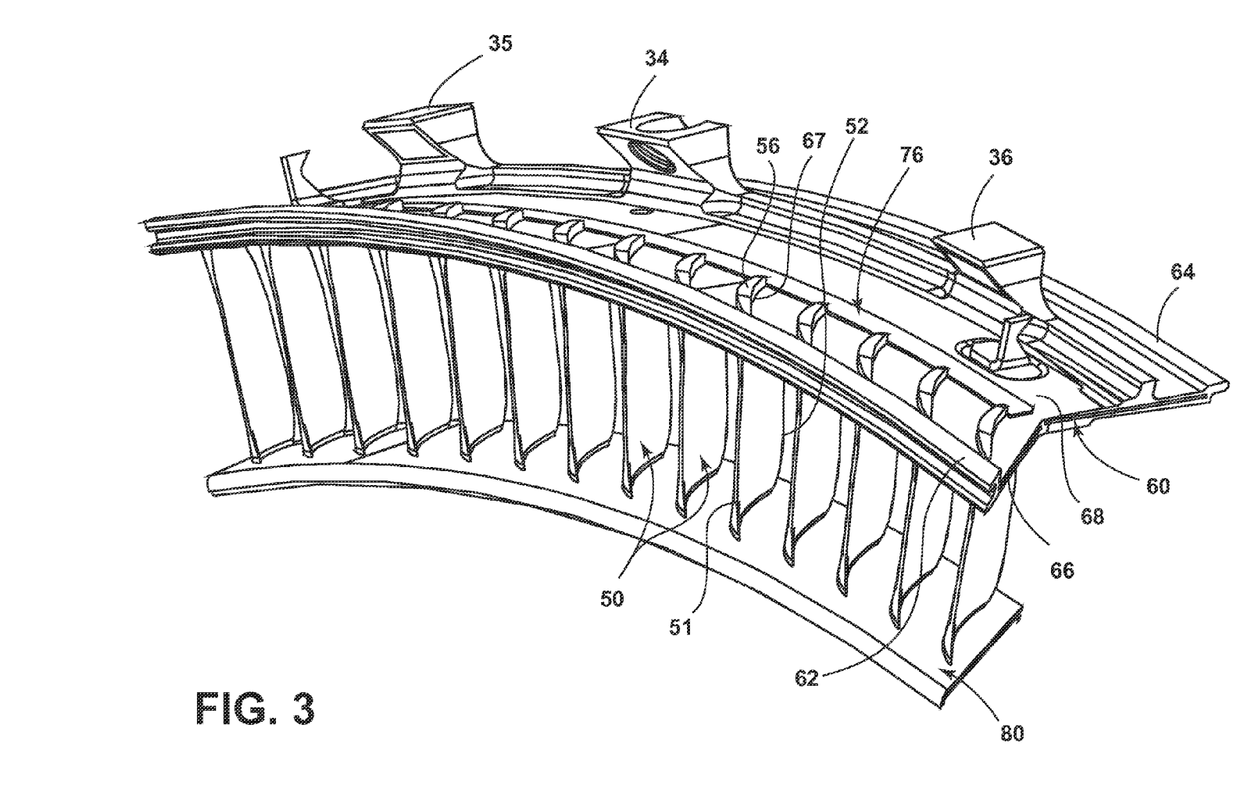
FIG. 3 is a perspective view of a portion of one of the airfoil assemblies of FIG. 2.

FIG. 3 illustrates an airfoil assembly 44 having a plurality of airfoils 50 arranged in a circumferential row and supported by an arcuate outer band 60 and an arcuate inner band 80. The arcuate airfoil assembly 44 shown in FIG. 3 has a sector angle of 36 degrees. In alternate embodiments, the airfoil assembly may have a different number of airfoils and may be supported at only one end of the airfoil 50, by an outer band 60 or by an inner band 80.

The mechanical, thermal and aerodynamic loads and moments from the airfoil assembly 44 are transmitted to the outer band 60 and these loads are reacted with the support structures, such as, for example, casing 25 (See FIG. 2) through support lugs 34, 35, and 36. These support lugs 34, 35, 36 engage with the support structures, such as the casing 25, and react the loads and moments from the airfoil assembly 44. The airfoil(s) 50, outer band 60 and inner band 80 may be made from a known material including, but not limited to, Titanium alloys, Nickel and Cobalt based alloys. The airfoil(s) 50, outer band 60, and inner band 80 can be made by a known processes including, but not limited to, casting, forging or forming.

The mechanical, aerodynamic, and thermal loads experienced by the individual airfoils 50 in the airfoil assembly 44 create stresses in the airfoils 50. The peak stresses experienced by individual airfoils 50 in the airfoil assembly 44 are not usually the same. Conventional analysis using known analytical methods has shown that the peak stresses in each airfoil 50 varies, depending on the circumferential location of the airfoil 50 the array and its location with respect to the support lugs 34, 35, 36. Peak stress variations in the airfoils may be as high as 25%. When the radial ends of the airfoils 50 are embedded in the inner and outer bands 80 and 60, vibratory stresses become concentrated in the airfoils 50 and high dynamic stresses usually appear in the proximity of the places where the airfoils 50 are embedded. For example, it has been seen that, the peak stress occurs in each airfoil 50 at the trailing edge 52, near the interface with the outer band 60. To meet aerodynamic requirements in compressor systems, airfoils 50 are relatively thin at the leading edge 51 and the trailing edge 52, and peak stresses are preferably to be avoided at these locations to prevent cracking.

Figure 4:
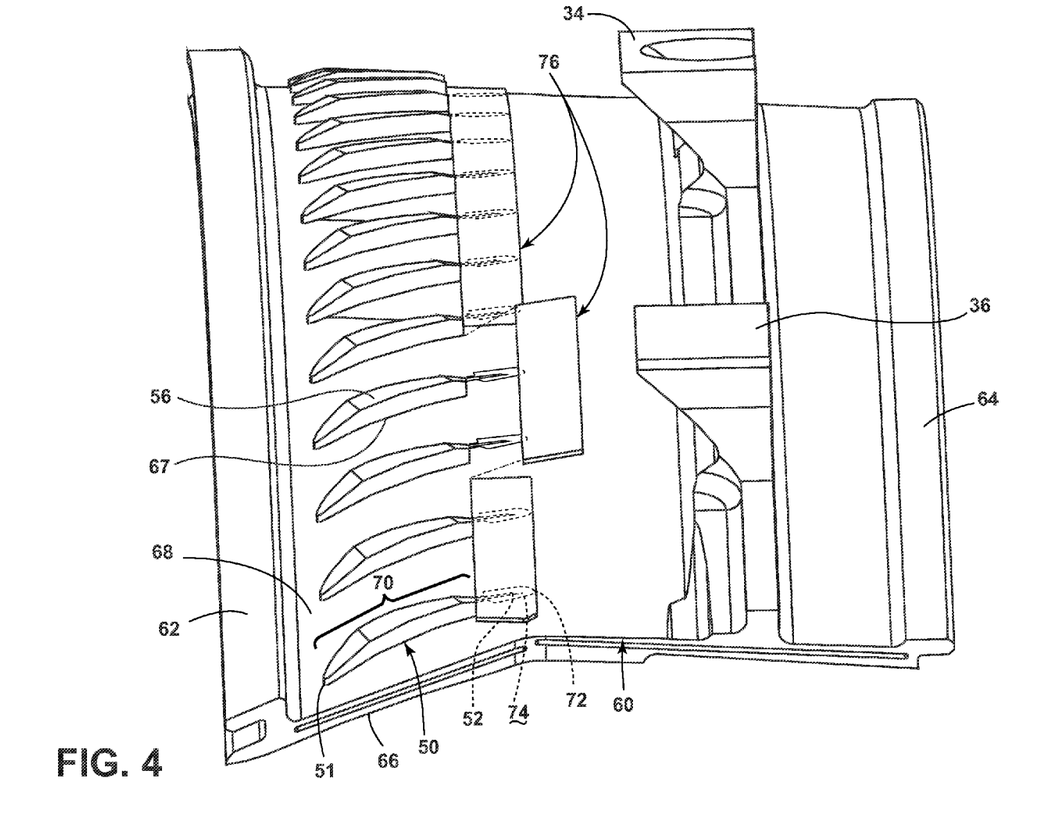
FIG. 4 is a perspective view, looking radially inward, of the airfoil assembly shown in FIG. 3.

As illustrated more clearly in FIG. 4, the outer band 60 has an inner side 66 and an outer side 68. The outer band 60 is rigidly coupled to the airfoil(s) 50 along a portion of an interface 70 between the outer band 60 and the airfoil(s) 50 for providing at least a portion of support for airfoil(s) 50. More specifically, the airfoil 50 has been illustrated with an end 56 of the airfoil 50 extending through an aperture 67 in the outer band 60. The aperture 67 corresponds generally to the shape of the airfoil 50 at its end 56. The airfoil 50 can be rigidly coupled to the outer band 60 in any suitable manner including, but not limited to, by brazing. For example, there can be a small braze gap (not shown) between the aperture 67 and the airfoil 50 that is later filled by braze material.

In the exemplary embodiment shown in FIG. 4, peak stress at the airfoil 50 trailing edge 52 at the interface with the outer band 60 is eliminated because the load path through the trailing edge 52 into the outer band 60 has been removed. This is accomplished by having a relief 72 in the outer band 60 near the trailing edge 52. The relief 72 defines a stress relief gap 74 between the trailing edge 52 and the outer band 60. Removing the load path at the thin trailing edge 52 of the airfoil 50 forces the airfoil loads and moments to be moved further forward towards the middle of the airfoil 50 where the airfoil thickness is greater, thereby reducing peak stresses. By beginning the bond of the airfoil 50 to the outer band 60 at a region of the airfoil 50 that is not at the trailing edge 52 and at a portion that is thicker than the trailing edge 52 the stress that is produced at this connection is lower compared to when the airfoil 50 is connected to the outer band 60 all the way to the trailing edge 52. The reductions in peak stresses in the airfoil(s) 50 significantly reduce the possibility of any cracking at the trailing edges 52 and improve the durability of the airfoil(s) 50. It will be apparent to those skilled in the art that, in other embodiments, a similar approach of having a relief may also be used near the leading edge 51 of the airfoil 50, and the relief may be located on the outer band 60, inner band 80, or both.

Figure 5:
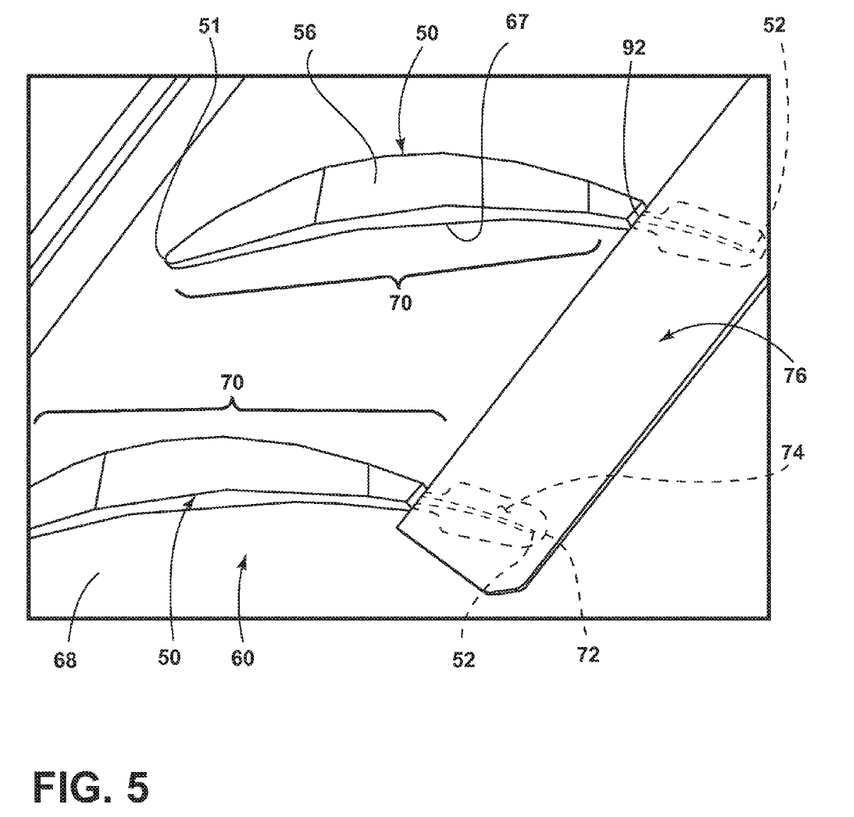
FIG. 5 is a close up view of a portion of the airfoil assembly shown in FIG. 3.

FIG. 5 is a close up view of a portion of the airfoil assembly 44 and illustrates that the relief 72 is a slot 77 defining the stress relief gap 74. The slot 77 extends from the inner side 66 of the outer band 60 through the outer side 68 and can be formed as a portion of the aperture 67. The slot 77 can have any suitable shape, contour, or profile including, but not limited to, that the slot 77 can have a shape substantially corresponding to an airfoil-contour shape of the at least one airfoil 50 near the trailing edge 52.

It will be understood that fluid flowing through the flow path 17 has a relatively higher pressure and the inclusion of the relief 72 allows for leakage of that fluid through the stress relief gap 74. In some instances, such leakage is tolerable, such as when the stress relief gap 74 is not needed for all of the airfoils in each airfoil assembly 44 or for stages that also include bleed holes. Embodiments of the invention include a cross-flow closure 76 that closes the relief 72 to prevent airflow through the stress relief gap 74 between the inner side 66 and outer side 68 of the outer band 60. This may be particularly beneficial in situations where additional leakage cannot be tolerated. In FIG. 4, a portion of the cross-flow closure 76 has been shown exploded away from the remainder of the airfoil assembly 44 for clarity purposes.

Figure 6:
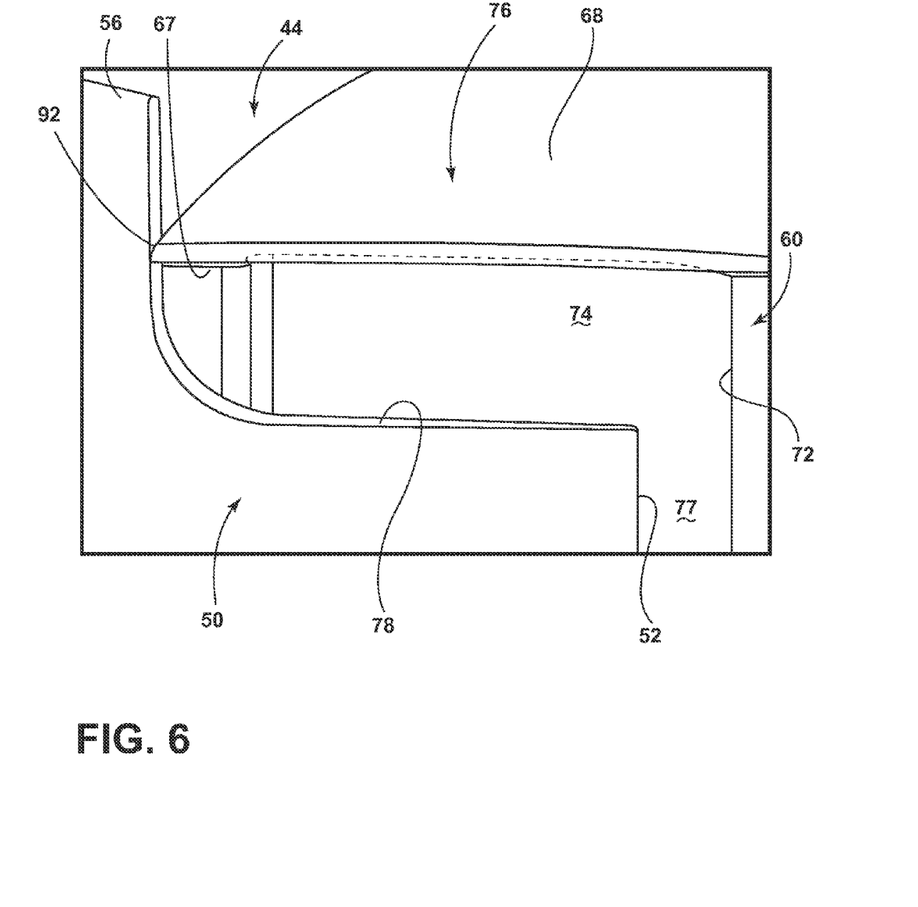
FIG. 6 is a cross-sectional view of a portion of the airfoil assembly of FIG. 3.

The cross-flow closure 76 has been illustrated as a cover mounted to the outer side 68 of the outer band 60 that closes the slot 77. The cross-flow closure 76 may be formed in any suitable manner including, but not limited to, that the cross-flow closure 76 may include a band located on the non-flowpath side that is affixed over the slot 77 to prevent secondary flow through the slot 77. The cross-flow closure 76 may be mounted to the outer band 60 in any suitable manner including, but not limited to, that it may be mechanically bonded to the outer side 68 of the outer band 60. FIG. 6 more clearly illustrates that the trailing edge 52 of the airfoil 50 includes a cutback 78, which allows for the cross-flow closure 76 to abut the airfoil at a thicker portion than that of the trailing edge 52. As can be seen, the cutback 78 in combination with the relief 72 may allow the stress relief gap 74 to be formed between the trailing edge 52 and the outer band 60 both at the back of the airfoil 50 and above a portion of the airfoil 50.

It will further be understood that multiple airfoils 50 may be included in the airfoil assembly 44 and that a relief 72 can be formed in the outer band 60 near the trailing edges 52 of the multiple airfoils 50 to define multiple reliefs 72. In such an instance, the cross-flow closure 76 may simultaneously cover the multiple reliefs 72. Alternatively, multiple cross-flow closures may be utilized and each may cover any number of the multiple reliefs 72.

Figure 7:
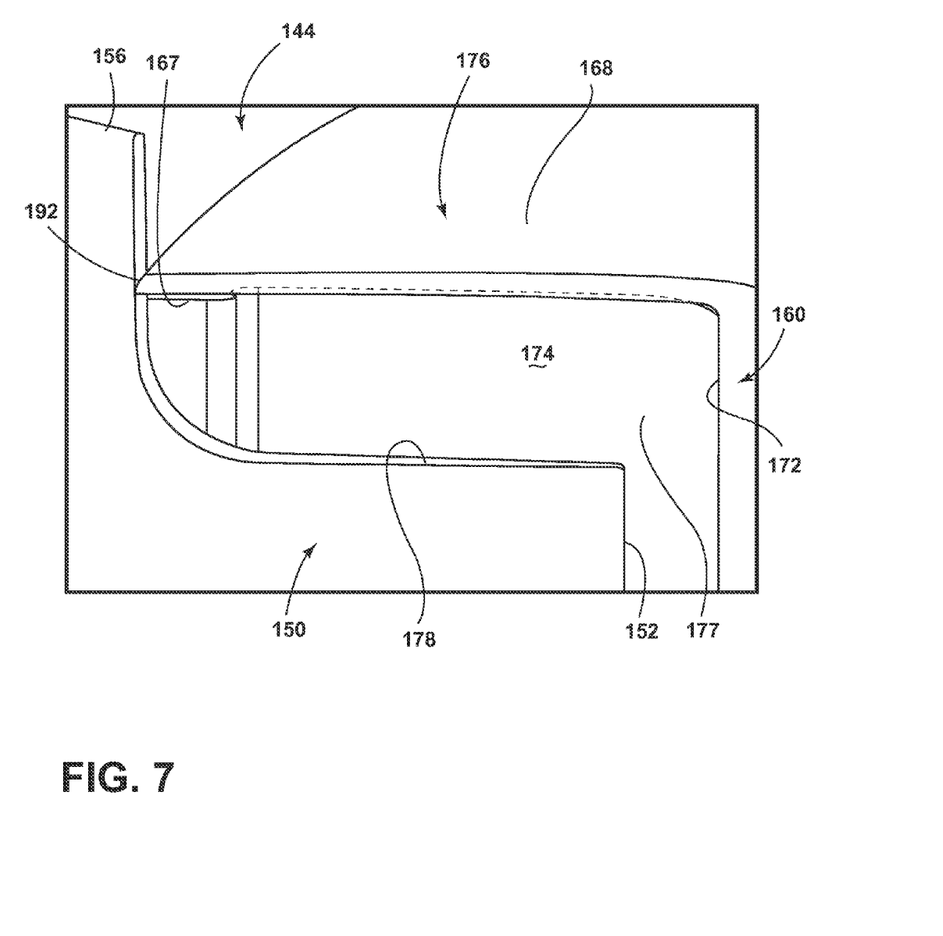
FIG. 7 is a cross-sectional view of a portion of an airfoil assembly having an alternative cross-flow closure.

FIG. 7 is a perspective view of another exemplary portion of an airfoil assembly 144. The airfoil assembly 144 is similar to the airfoil assembly 44 previously described and therefore, like parts will be identified with like numerals increased by 100, with it being understood that the description of the like parts of the airfoil assembly 44 apply to the airfoil assembly 144, unless otherwise noted. One difference is that the airfoil assembly 144 has a relief 172 that includes a recess 177 opening onto the inner side (not shown) of the outer band 160 and the cross-flow closure 176 is formed by a portion of the outer band 160 forming the relief 172. The recess 177 has been illustrated as a pocket in the outer band 160, which isolates the trailing edge 152 of the airfoil 150 from the outer band 160. In this manner, the recess 177 does not go through the outer side 168 of the outer band 160; instead, the recess 177 stops short of the outer side 168 of the outer band 160. This allows the remainder of the outer band 160 to form the cross-flow closure 176. As with the previously illustrated embodiment, the trailing edge 152 of the airfoil 150 includes a cutback 178 such that the portion of airfoil 150 at the cutback 178 does not extend to the outer band 160. The radial gap formed between the cutback 178 and the cross-flow closure 176 can discourage braze flow.

Regardless of how the cross-flow closure 76, 176 is formed, the cross-flow closure 76, 176 can prevent additional secondary flow into the non-flowpath cavity which exists between the airfoil assembly 44 and its outer support structure. By sealing the relief features, no additional leakage flow to this outer cavity is introduced; thus, impact to compressor operability is eliminated. Further, regardless of how the cross-flow closure 76, 176 is formed, a butt joint 92, 192 can be formed between airfoil 50, 150 and the cross-flow closure 76, 176. The butt joint 92, 192 may be brazed to form a seal. While such a seal will stop any leakage it will not carry stress load.

The above-described embodiments provide a variety of benefits including, but not limited to, providing stress relief to the airfoil edge, which is a common high-stress region, without introducing additional leakage. Thus, such embodiments may be utilized in a compressor section of an engine and compressor operability will not be adversely affected.

Although the methods and components such as airfoils, outer bands, inner bands, and airfoil segments described herein are described in the context of a compressor used in a turbine engine, it is understood that the airfoils and airfoil assemblies and methods of their manufacture or repair described herein are not limited to compressors or turbine engines. The airfoils and airfoil assemblies illustrated in the figures included herein are not limited to the specific embodiments described herein, but rather, these can be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil assembly for a turbine engine, comprising:
   at least one airfoil having a leading edge and a trailing edge;
   a band having an inner side and an outer side and rigidly coupled to the at least one airfoil along a portion of an interface between the band and the at least one airfoil for providing at least a portion of support for the at least one airfoil;
   a relief located in the band at the leading edge or the trailing edge of the at least one airfoil and defining a stress relief gap between the band and the leading edge or the trailing edge; and
   a cross-flow closure closing the relief to prevent airflow through the relief between the inner and outer sides;
   wherein the relief is located near the trailing edge of the at least one airfoil and forms a gap between the trailing edge and the band;
   wherein multiple airfoils are included and the relief is formed in the band near the trailing edge of each of the multiple airfoils to define multiple reliefs; and
   wherein the cross-flow closure simultaneously covers multiple reliefs.

2. The airfoil assembly according to claim 1 wherein the relief is a slot that extends from the inner side of the band through the outer side of the band.

3. The airfoil assembly according to claim 2 wherein the cross-flow closure is a cover mounted to the outer side of the band and closes the slot.

4. The airfoil assembly according to claim 2 wherein the slot has a shape substantially corresponding to an airfoil-contour shape of the at least one airfoil near the trailing edge.

5. The airfoil assembly according to claim 1 wherein the at least one airfoil is rigidly coupled to the band by brazing.

6. The airfoil assembly according to claim 1 wherein the band is an outer band.

7. The airfoil assembly according to claim 6, further comprising an inner band operably coupled to the at least one airfoil.

8. An airfoil assembly for a turbine engine, comprising:
at least one airfoil having a leading edge and a trailing edge;
a band having an inner side and an outer side and rigidly coupled to the at least one airfoil along a portion of an interface between the band and the at least one airfoil for providing at least a portion of support for the at least one airfoil;
a relief located in the band at the leading edge or the trailing edge of the at least one airfoil and defining a stress relief gap between the band and the leading edge or the trailing edge; and
a cross-flow closure closing the relief to prevent airflow through the relief between the inner and outer sides;
wherein the relief includes a recess opening onto the inner side of the band and the cross-flow closure is formed by a portion of the band forming the relief; and
wherein the trailing edge of the at least one airfoil includes a cutback such that the trailing edge of the at least one airfoil at the cutback does not extend to the band.

9. A compressor system comprising:
a stator assembly having a flow path for flowing a fluid there through, wherein the stator assembly includes a plurality of arcuate airfoil assemblies arranged circumferentially around a longitudinal axis, each airfoil assembly comprising:
at least one airfoil having a leading edge and a trailing edge;
an arcuate inner band operably coupled to the at least one airfoil;
an arcuate outer band having an inner side and an outer side and rigidly coupled to the at least one airfoil along a portion of an interface between the arcuate outer band and the at least one airfoil for providing at least a portion of support for the at least one airfoil;
a relief located in the band at the leading edge or the trailing edge of the at least one airfoil and defining a stress relief gap between the arcuate outer band and the leading edge or the trailing edge; and
a cross-flow closure closing the relief to prevent airflow through the relief between the inner and outer sides;
wherein the relief is located in the arcuate outer band near the trailing edge of the at least one airfoil;
wherein the relief is a slot that extends from the inner side of the arcuate outer band through the outer side of the arcuate outer band;
wherein multiple airfoils are included and a slot is formed in the arcuate outer band near each trailing edge of each of the multiple airfoils to define multiple slots;
wherein multiple airfoils are included and the slot is formed in the arcuate outer band near each trailing edge of each of the multiple airfoils to define multiple slots; and
wherein the cross-flow closure simultaneously covers multiple slots.

10. The compressor system according to claim 9 wherein the cross-flow closure is a cover mounted to the outer side of the arcuate outer band and closes the slot.

11. A compressor system comprising:
a stator assembly having a flow path for flowing a fluid there through, wherein the stator assembly includes a plurality of arcuate airfoil assemblies arranged circumferentially around a longitudinal axis, each airfoil assembly comprising:
at least one airfoil having a leading edge and a trailing edge;
an arcuate inner band operably coupled to the at least one airfoil;
an arcuate outer band having an inner side and an outer side and rigidly coupled to the at least one airfoil along a portion of an interface between the arcuate outer band and the at least one airfoil for providing at least a portion of support for the at least one airfoil;
a relief located in the arcuate outer band at the leading edge or the trailing edge of the at least one airfoil and defining a stress relief gap between the arcuate outer band and the leading edge or the trailing edge; and
a cross-flow closure closing the relief to prevent airflow through the relief between the inner and outer sides;
wherein the relief is located in the arcuate outer band near the trailing edge of the at least one airfoil;
wherein the relief includes a recess opening onto the inner side of the arcuate outer band and the cross-flow closure is formed by a portion of the arcuate outer band; and
wherein the trailing edge of the at least one airfoil includes a cutback such that the trailing edge of the at least one airfoil at the cutback does not extend to the arcuate outer band.

\* \* \* \* \*